(12) United States Patent
Kennedy et al.

(10) Patent No.: US 6,181,039 B1
(45) Date of Patent: Jan. 30, 2001

(54) CENTRIFUGAL CAPILLARY SEAL FOR USE WITH FLUID DYNAMIC BEARINGS

(75) Inventors: Michael D. Kennedy, Boulder Creek; Alan Lyndon Grantz, Aptos, both of CA (US)

(73) Assignee: Seagate Technology LLC, Scotts Valley, CA (US)

(*) Notice: Under 35 U.S.C. 154(b), the term of this patent shall be extended for 0 days.

(21) Appl. No.: 09/330,705

(22) Filed: Jun. 11, 1999

Related U.S. Application Data
(60) Provisional application No. 60/089,005, filed on Jun. 11, 1998.

(51) Int. Cl.[7] .............................. H02K 7/08; F16C 32/06
(52) U.S. Cl. .............................................. 310/90; 384/110
(58) Field of Search ................... 310/90, 90.5; 384/108, 384/110, 123, 124, 107, 133; 49/478.1

(56) References Cited

U.S. PATENT DOCUMENTS

| | | | | |
|---|---|---|---|---|
| 5,427,456 | * | 6/1995 | Hensel | 384/112 |
| 5,448,120 | * | 9/1995 | Schaule et al. | 310/90 |
| 5,876,124 | * | 3/1999 | Zang et al. | 384/107 |

* cited by examiner

Primary Examiner—Nestor Ramirez
Assistant Examiner—Guillermo Perez
(74) Attorney, Agent, or Firm—Flehr Hohbach Test Albritton & Herbert LLP (57) ABSTRACT

A fluid dynamic bearing usable in a spindle motor where the bearing is defined between two relative rotating surfaces which are open to the air at both ends, allowing the use of a fixed shaft. At one end of the shaft, at least one high volume, low stiffness seal is used, in combination with a low volume, high stiffness seal. The pressure differential between these two seals is balanced by one or more high stiffness, low volume seals spaced axially away along the shaft.

13 Claims, 6 Drawing Sheets

FIG. 1

PRIOR ART

CENTRIFUGAL CAPILLARY SEAL FOR USE WITH FLUID DYNAMIC BEARINGS

CROSS-REFERENCE TO RELATED APPLICATION

This application claims priority to Provisional Application Ser. No. 60/089,005 filed Jun. 11, 1998, and incorporated herein by reference.

This application extends and modifies the principles taught in U.S. patent application Ser. No. 09/060,328 filed Apr. 14, 1998 (A-65481) and U.S. patent application Ser. No. 09/060,342 filed Apr. 14, 1998 (A-65485), assigned to the assignee of this invention and incorporated herein by reference.

FIELD OF THE INVENTION

The present invention is related to fluid dynamic bearings for use in a disc drive and more specifically to incorporating a top cover attachment for a fixed shaft into a motor using a flat plate fluid dynamic bearing.

BACKGROUND OF THE INVENTION

Magnetic disc drives are used for magnetically storing information. In a magnetic disc drive, a magnetic disc rotates at high speed and a transducing head "flies" over a surface of the disc. This transducing head records information on the disc surface by impressing a magnetic field on the disc. Information is read back using the head by detecting magnetization of the disc surface. The transducing head is moved radially across the surface of the disc so that different data tracks can be read back.

Over the years, storage density has tended to increase and the size of the storage system has tended to decrease. This trend has led to greater precision and lower tolerance in the manufacturing and operating of magnetic storage discs. For example, to achieve increased storage densities the transducing head must be placed increasingly close to the surface of the storage disc. This proximity requires that the disc rotate substantially in a single plane. A slight wobble or run-out in disc rotation can cause the surface of the disc to contact the transducing head. This is known as a "crash" and can damage the transducing head and surface of the storage disc resulting in loss of data.

From the foregoing discussion, it can be seen that the stability of the shaft and bearing assembly which supports the storage disc is of critical importance. One typical bearing assembly comprises ball bearings supported between a pair of races which allow a hub of a storage disc to rotate relative to a fixed member. However, ball bearing assemblies have many mechanical problems such as wear, run-out and manufacturing difficulties. Moreover, resistance to operating shock and vibration is poor, because of low damping. Thus, there has been a search for alternative bearing assemblies for use with high density magnetic storage discs.

One alternative bearing design is a fluid dynamic bearing. In a fluid dynamic bearing, a lubricating fluid such as gas or a liquid or air provides a bearing surface between a fixed member of the housing and a rotating member of the disc hub. Typical lubricants include oil or ferromagnetic fluids. Fluid dynamic bearings spread the bearing interface over a large continuous surface area in comparison with a ball bearing assembly, which comprises a series of point interfaces. This is desirable because the increased bearing surface reduces wobble or run-out between the rotating and fixed members. Further, improved shock resistance and ruggedness is achieved with a hydrodynamic bearing. Also, the use of fluid in the interface area imparts damping effects to the bearing which helps to reduce non-repeat runout.

However, some fluid dynamic bearing designs themselves suffer from disadvantages, including a low stiffness-to-power ratio and increased sensitivity of the bearing to external loads or shock.

A desirable solution to this problem would be to have the spindle motor attached to both the base and the top cover of the disc drive housing. This would increase overall drive performance. A motor attached at both ends is significantly stiffer than one held by only one end.

Typically, fluid dynamic motor designs provide no method for top cover attachment. The reason for this is that in order to have top cover attachment, the motor (i.e. the fluid bearing which separates the fixed and moving parts) would need to be opened on both ends. Opening a motor at both ends greatly increases the risk of oil or fluid leakage out of the fluid dynamic bearing. This leakage among other things is caused by small differences in net flow rate created by differing pumping pressures in the bearing. If all of the flows and pressures within the bearing are not carefully balanced, a net pressure rise toward one or both ends may force fluid out through the capillary seal. Balancing the flow rates and pressures in conventional, known fluid bearing designs is difficult because the flow rates created by the pumping grooves are a function of the gaps defined in the fluid dynamic bearing, and the gaps, in turn, are a function of parts tolerances. Thus, a need exists for a new approach to the design of a fluid dynamic bearing based motor and especially the seals used to retain fluid in the motor.

As presently designed, fluid dynamic bearing motors seal the open end, whether it is just one end or both ends, using a capillary seal which simply comprises two relatively angled surfaces at the end of the gap with the seal being formed from one surface angled relative to the other. The problem with such conventional capillary seals is that they depend entirely on surface tension to maintain or draw fluid back into the motor. When used in pairs, as in a motor having an FDB which is open at both ends, such as a top cover attached motor, such a pair of capillary seals can be categorized as a pull-pull system; when there is more oil in one end than the other, the capillary seal with the lesser amount of oil pulls harder than the opposing capillary seal, and restores equilibrium. However, such capillary seals have been shown to be quite weak and have low volume. The problem with this low stiffness in a motor open at two ends is that only a small pressure imbalance in the motor can overcome the low seal stiffness, and cause oil to be lost with larger seal volume, the seal reservoir can store oil for equalization purposes.

SUMMARY OF THE INVENTION

The present invention provides a fluid dynamic bearing usable in a bearing cartridge or spindle motor or the like where the bearing is defined between two relatively rotating surfaces which are open to the air at both ends, thereby allowing the use of a fixed shaft; in a disc drive this allows the shaft to be attached to both the base and top cover, substantially increasing shaft stiffness.

In a current especially useful design, a fixed shaft has an axial thrust plate at or near one end facing a counterplate. To provide top cover attachment, the shaft must protrude through the counterplate, to seal the fluid inside the bearing one or more active seals are used at each end of the shaft to provide a pressure balanced system. Preferably, at one end, near the counterplate, at least one high volume, low stiffness seal is used, in combination with a low volume, high stiffness seal; the pressure differential between these two seals is balanced by one or more high stiffness, low volume seals space axially away along the shaft. This latter seal or seals may be placed at the opposite shaft end, or incorporated into the journal bearing grooves on the shaft.

Other features and advantages of the present invention would become apparent to a person of skill in the art who studies the present invention disclosure given with respect to the following figures.

DETAILED DESCRIPTION OF A PREFERRED EMBODIMENT

Figure 1:
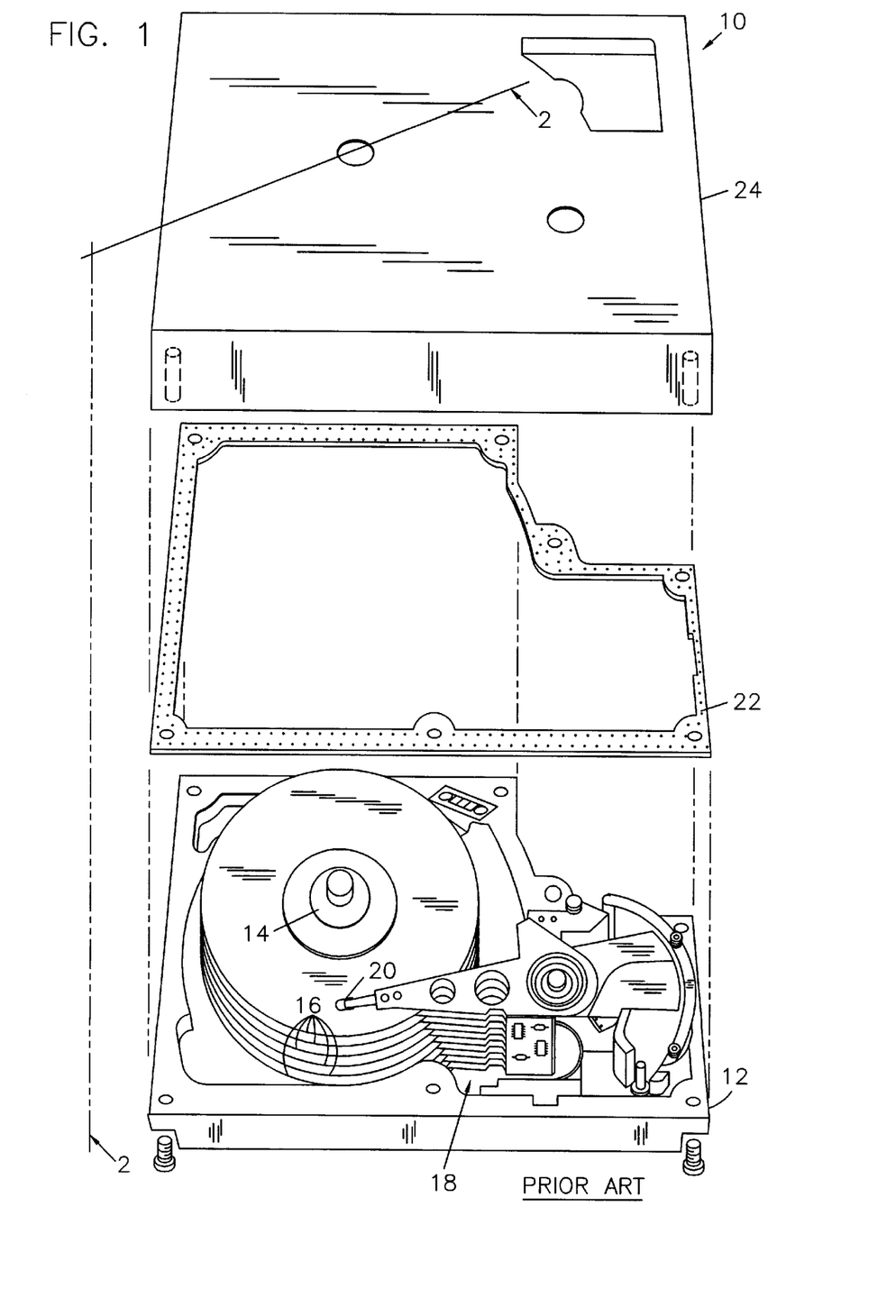
FIG. 1 is an exploded perspective view of a disc drive in which the present invention is useful.

FIG. 1 is an exploded perspective view of a magnetic disc drive storage system in which the present fluid dynamic bearing cartridge could be used. In the example to be discussed below, the use of the fluid dynamic bearing and associated cartridge will be shown in conjunction with a spindle motor. Clearly, this bearing design is not limited to use with this particular design of a disc drive, which is shown only for purposes of the example. The bearing cartridge (that is the bearing and motor elements, excluding the hub which is attached to support a disc) also has numerous other uses outside the field of disc drives wherever a shaft fixed on both ends and surrounded at least in part by a rotating sleeve is desirable.

In this particular example, the storage system 10 includes a housing base 12 having spindle motor 14 which rotatably carries storage discs 16. An armature assembly 18 moves transducers 20 across the surface of the discs 16. The environment of discs 16 is sealed by seal 22 and cover 24. In operation, discs 16 rotate at high speed while transducers 20 are positioned at any one of a radially differentiated track on the surface of the discs 16. This allows the transducers 20 to read and write magnetically encoded information on the surfaces of discs 16 at selected locations. The discs rotate at very high speeds, several thousand RPM, in order to maintain each transducer flying over the surface of the associated disc. In present day technology, the spacing distance between the transducer and the rotating disc surface is measured in microinches; thus it is absolutely essential that the disc does not tilt or wobble. Thus, a highly stable FDB to support the hub of motor 14 for rotation about the shaft is essential.

The present invention will next be described with respect to the following figures. This application will disclose in detail an embodiment of the capillary seal and grooved pumping seal of the invention. Details of several of the structural elements which appear herein can also be found by referring to the cited co-pending patent applications which are incorporated herein by reference. The arrangement of one or more of these seals to support the shaft, preferably in a balanced pressure environment, will then be described with reference to FIGS. 3A–3D, 4 and 5.

Figure 2:
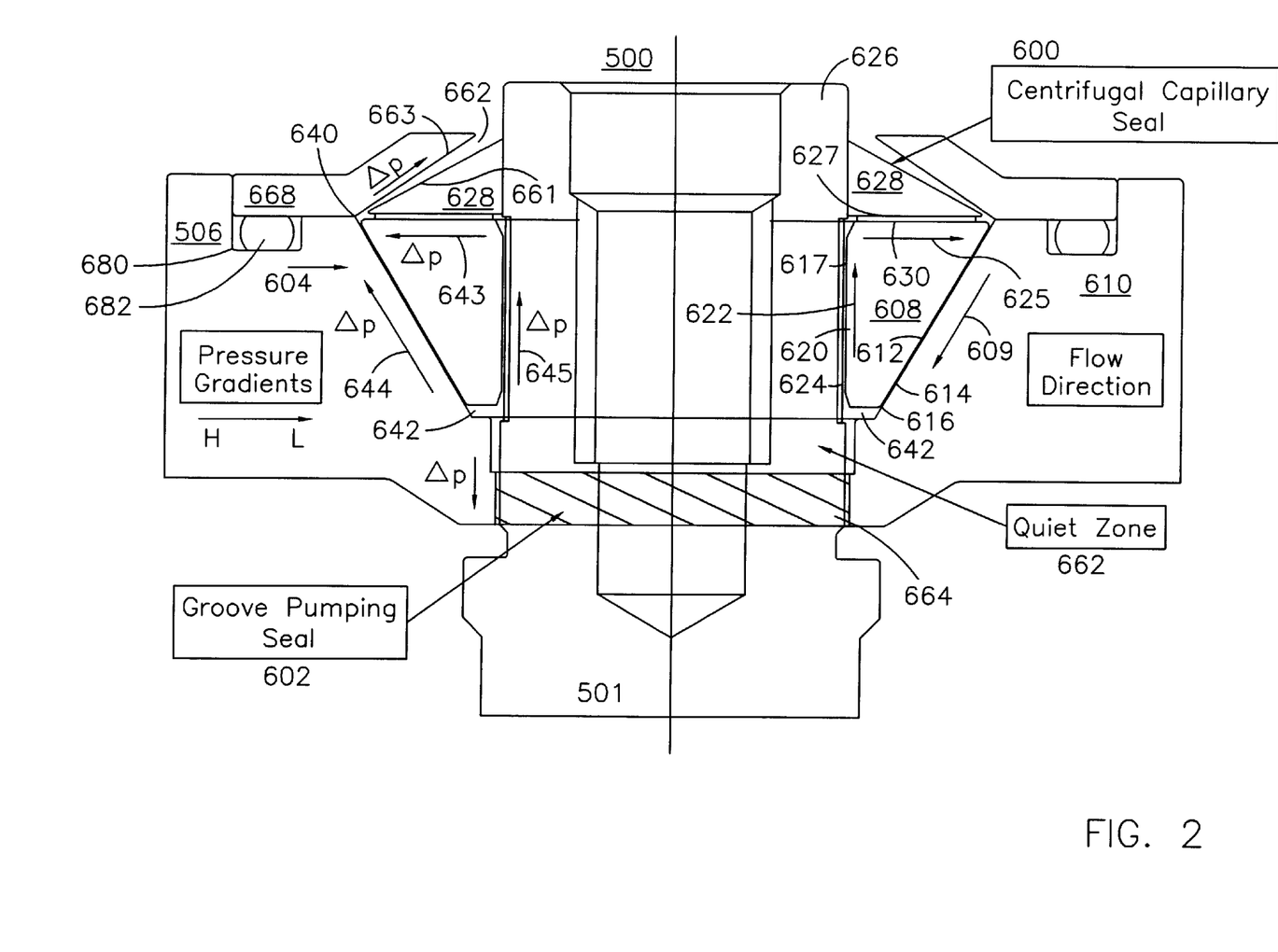
FIG. 2 is a vertical sectional view of a FDB sealing system incorporating both a centrifugal capillary seal and a grooved pumping seal.

Referring next to FIG. 2, the sealing design shown in this figure results from the need to providing a very positive sealing means for fluid dynamic bearing motors. Further, by combining the characteristics of the centrifugal capillary seal generally indicated at 600 (which provides a means for pushing fluid toward the fluid bearing when the motor is spinning and for holding the fluid in the gap when the motor is at rest), and the grooved pumping seal generally indicated at 602 (which provides a means for holding and sealing the fluid in the FDB), the fluid is positively maintained within the system. Each of the seal means also provides means for expelling any air bubbles which may enter the bearing system. The seals are illustrated in conjunction with a conical bearing. They can be used alone, or the seals can be used together without the intermediate bearing as will be explained with reference to FIGS. 3–5.

Continuing with FIG. 2, as is already well known, the primary support system is the bearing which comprises the bearing cone 608 and the surrounding bearing seat 610. The cone and seat define facing surfaces 612, 614 which are separated by gap 616 of about five microns (although this dimension is representative of example only; it may be greater or less depending on the tolerances achieved by parts and assembly methods). Fluid fills this gap 616, and is maintained under pressure within this gap by grooves 618 on the surface of the bearing cone 608. To allow for fluid circulation, and maintenance of the fluid in the gap 616, the gap is extended over the back surface 620 of the bearing cone 504 by providing fluid pathways 622 running linearly along the back surface of the cone or the facing surface 624 of the shaft. These pathways 622 allow the fluid to pass axially toward the distal end 626 of the shaft 500. The path or bearing gap for the fluid is completed through a gap between a wall 627 of the sealing cone 628 and the upper surface 630 of the bearing cone 608. Most efficiently, the path is through grooves 632 formed in the top surface 630 of the cone 608, although the grooves could also be provided in the complementary surface of the sealing cone 628.

As is shown by the arrows marked Δp on FIG. 2, the pumping action of the grooves 618 on the face of the cone 608 creates a pressure differential from the apex 640 of the bearing cone toward the narrower end 642 of the cone. The pressure gradients, indicated by the arrows labeled Δp, are from higher to lower pressure in the direction of the arrow. With the exception of the pumping sections, Δp and flow are in the same direction. Thus, the fluid flow over the surface of the cone being generally from the point of lower to higher pressure, is as marked by the arrow 644 and continues axially toward the distal end 626 of the shaft following the path marked by arrow 646 and returns to the apex of the cone (not shown) following the pressure arrow 648.

In order to provide a means for fluid to be inserted into the fluid dynamic bearing, as well as to provide a means for air bubbles to be expelled from the bearing 610, a centrifugal capillary seal 660 is incorporated into the design, leading from the open end 662 of the fixed shaft 500 and relatively rotating parts, down to the apex 640. Details of this design are found in the incorporated application. Basically, as disclosed, the centrifugal capillary seal 660 operates to continuously purge the FDB of any air which might inadvertently enter the system, while very effectively sealing the fluid within the bearing system.

In order to further enhance the sealing stiffness of the system, a grooved pumping seal 602 is provided, typically and preferably immediately axially inward from base 642 of the bearing cone, between the bearing cone and the central portion of the shaft where the stator is mounted. This grooved pumping seal 602, in a preferred form, can be defined on the face of a central section 669 of the bearing seat 610 which also supports one surface 614 of the fluid dynamic bearing. In a preferred form, this grooved pumping seal comprises an ungrooved surface section or quiet zone 662 surrounding a portion of the ungrooved shaft 501 immediately adjacent the base or narrow section 642 of the bearing cone, and a grooved pumping region 664 which also closely surrounds an ungrooved section of the shaft 501 immediately adjacent the quiet zone 662. This grooved pumping seal 602 is intended to be a low volume, very high stiffness seal. It is a capillary seal which employs active pumping by virtue of the presence of relatively deep grooves in one section 664 of the seal to provide very high seal stiffness. Seal stiffness is defined as the change in pressure developed across the seal divided by the axial length of fluid in the seal or Pa/mm (Psi/inch). As used herein, seal stiffness represents the seal's ability to retain fluid in the fluid dynamic bearing. When the shaft is at rest, the oil settles into the groove annulus 664 but most of it does not pass further down the shaft because of the capillary effect of diverging external annulus and the small radial gap between the shaft and rotating sleeve. When the motor spins up, the relative rotation of the shaft 500 and the surrounding section 664 of the grooved pumping seal create the pressure gradient indicated by the arrow $\Delta p$, 666. This causes an oil fluid to flow out of the grooves into the quiet zone 669 as indicated by the arrow 668. Further, because of this quiet zone, there is no pumping action to force the oil out of the quiet zone of the grooved pumping seal into the fluid dynamic bearing, so that the necessary fluid for effective operation of this grooved pumping seal is maintained. Any air bubbles which appear in the quiet zone would tend to be captured by the pressure gradients in the fluid dynamic bearing and be expelled from the distal end of the shaft through the centrifugal capillary seal; any further air bubbles which moved into the grooves of the grooved section 664 could be expelled into the interior section of the motor because of the strong pressure gradient created by the rotation of the grooved pumping seal.

Finally, it should be noted that the depth of the grooves and/or the width of the grooves diminishes as the oil is moved up through the grooved pumping zones 664 into the quiet zone 669. This enhances and provides a means for pumping the oil efficiently out of the grooves into the quiet zone during motor operation, while providing a strong capillary effect in the grooved region to maintain the oil in the grooved pumping seal 602 when the motor is not in operation.

It should be further noted that although the preferred embodiment of this design discloses utilizing grooves on the central section of the bearing seat, a separate grooved piece could be provided separate and apart from the bearing seat; and in a further alternative, that the central section of the bearing seat which surrounds the shaft could be left entirely smooth, and the grooves instead imposed upon the shaft.

Figure 3A:
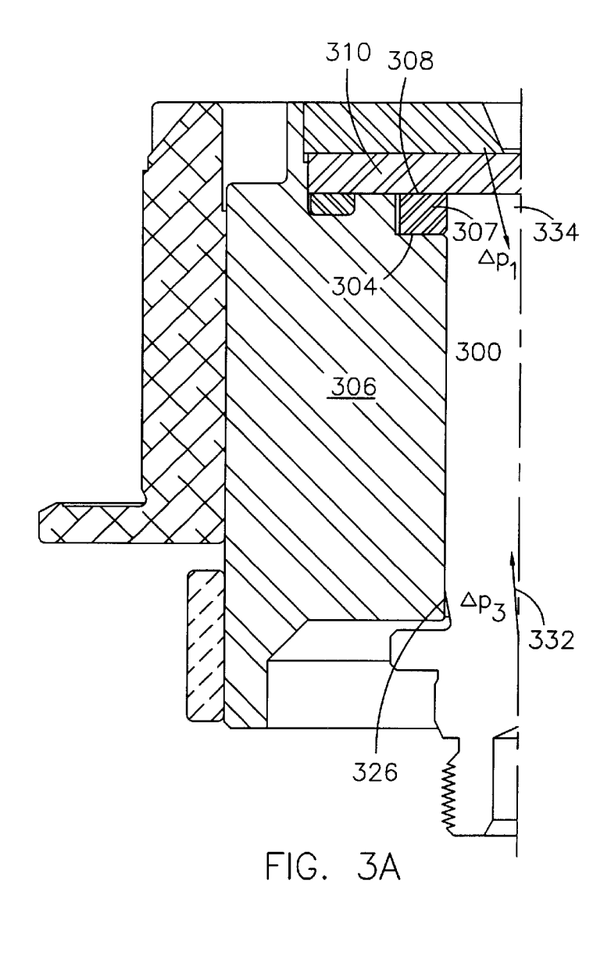
FIGS. 3A–3D show a prior art FDB design and a modification thereof to incorporate the present invention.
Figure 3B:
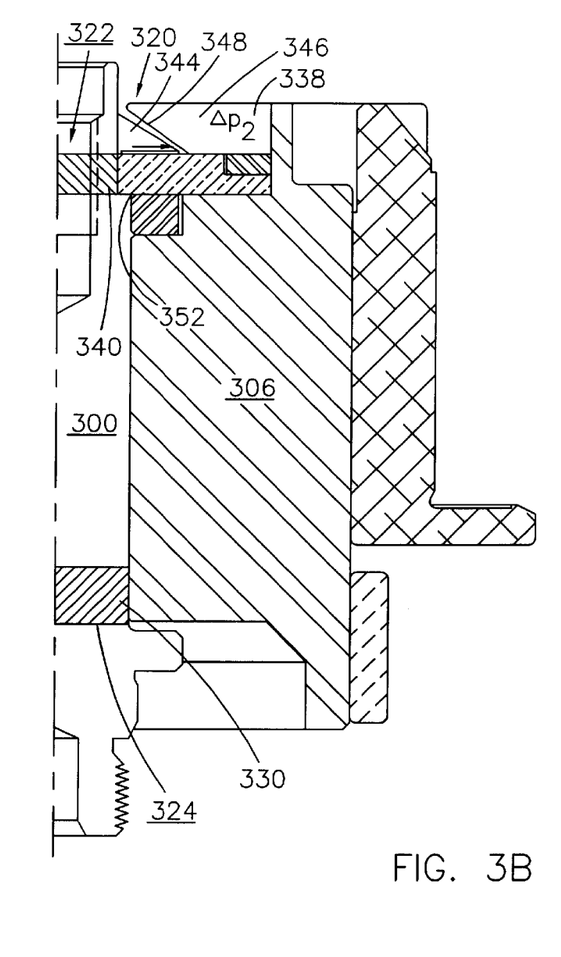

The following FIGS. 3A–3D, 4 and 5 will be used to illustrate how current designs utilizing hydrodynamic bearing can be modified utilizing the centrifugal capillary seal and/or grooved pumping seal described above to allow for a top cover attachment on a flat plate fluid dynamic bearing motor. A current design, FIG. 3A shows a shaft 300 supported by a hydrodynamic bearing which utilizes fluid contained between the shaft 300 and sleeve 306 as well as between thrust plate 302 and sleeve 304 as well as counterplate 308. The counterplate 308 extends entirely over the thrust plate and shaft to enclose the fluid dynamic bearing. To provide a top cover attachment, which would substantially increase the stability of the shaft in the system, the shaft 300 must extend through the counterplate as shown in FIG. 3B. In this figure, the stiffness of the shaft relative to the rotating sleeve 306 is maintained by providing a centrifugal capillary seal 320 and a grooved pumping seal 322 which cooperate to maintain stiffness without loss of fluid at one end of the shaft; and a grooved pumping seal 324 at the distal end of the shaft to maintain the fluid in the bearing and provide the proper fluid distribution. This grooved pumping seal 324 replaces the need for the capillary seal 326 which appears at the distal end of the shaft from the thrust plate in the design of FIG. 3A.

The grooved pumping seal and centrifugal capillary seals used in the design of FIG. 3B utilize generally these same principals and features as described with respect to FIG. 2. Specifically, the grooved pumping seal at the base of the shaft distal from the thrust plate comprises a series of grooves 330 which are shown imposed on the shaft but which may equally well be formed on an inner surface of the sleeve 306 and which serve both to collect some of the fluid to prevent its leakage out of the system when the system is at rest, and to create a pumping pressure $\Delta p3$ in the direction of the arrow 332 when the system is in motion. The pressure $\Delta p3$ is intended to be equal to the pressure difference between the pressure $\Delta p1$ 334 established in the axial direction toward the distal end of the shaft by the grooved pumping seal 322 near the top end of the shaft, minus the lesser pressure $\Delta p2$, established by the centrifugal capillary seal. The grooved pumping seal is preferably established by grooves 340 formed on either the exterior surface of the shaft 300 or the inner surface of the counter plate 310 and is located adjacent the counter plate 310 where the shaft passes through the counter plate. The grooved pumping seal is a high pressure, low volume seal which will establish a pressure down along the shaft toward the distal end of the shaft which is in turn enclosed by grooved pumping seal 324 which has established the pressure $\Delta p3$ in the opposite direction. The centrifugal capillary seal 320, which will have a pressure $\Delta p2$ which is less than the pressure $\Delta p1$ is intended to be a higher volume lower pressure seal. It is incorporated into the design to prevent the leakage of any fluid which supports the hydrodynamic bearing into the atmosphere past the shaft where the shaft now passes through the thrust plate. The centrifugal capillary seal includes, as disclosed above, a cone 344 and retainer 346 whose diverging surfaces cooperate with the fluid which is supporting the hydrodynamic bearing to form a meniscus 348 which will prevent fluid from exiting the hydrodynamic bearing which is supporting the shaft 300 and the thrust plate 304 to allow rotation of the sleeve 306 relative to this fixed shaft.

Figure 3C:
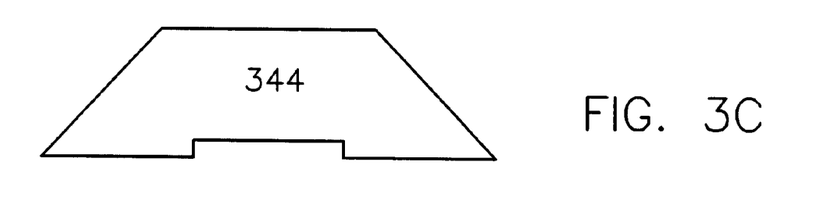
Figure 3D:
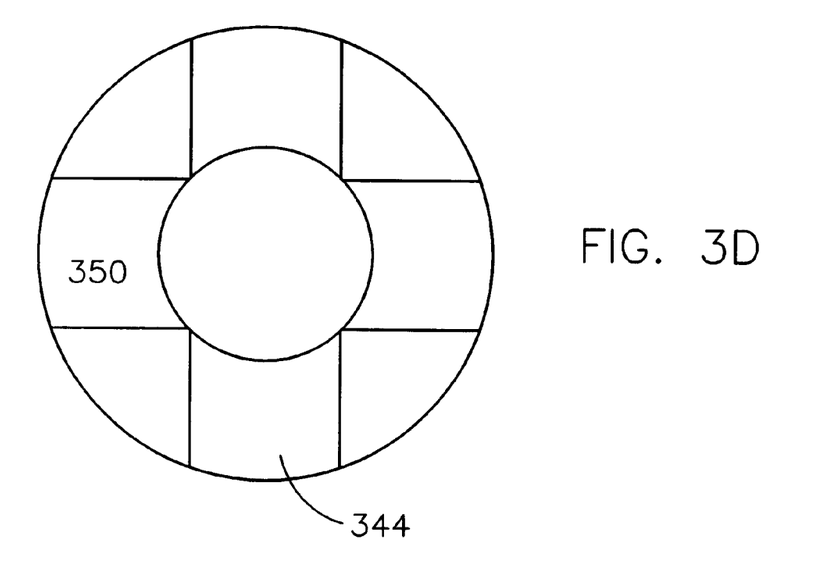

The cone 344 is shown in a sectional view in FIG. 3C and in a bottom plan view in FIG. 3D. It can be seen, especially in FIG. 3D, that the cone does include channels 350 extending radially along the bottom surface of the cone so that the fluid which passes over the upper surfaces of the counter plate 310 as well as through the thrust plate or between the thrust plate and the shaft by virtue of relief openings 352, and which will further be passed through the grooved pumping seal 340 up toward the cone 344 can then travel radially outward and between the surfaces of the cone 344 and the retainer 346 to form the meniscus 348 which retains the fluid to prevent its escape from the bearing. Similar radially ducted passages extending beneath or through the cone could be used.

As the hub/sleeve 306/307 spins, a manometer effect will be produced when the motor is spun up creating the pressure differential $\Delta p2$, 338 along the centrifugal capillary seal. As discussed below, $\Delta p1$ created by grooved pumping seal (which is greater than $\Delta p2$) will draw the oil down between the cone and retainer 344, 346. The grooving of the grooved pumping seal 324, located at the distal end of the shaft is initially stronger than the difference between $\Delta p1$ and $\Delta p2$. Therefore, as the shaft spins oil or similar bearing fluid will be drawn up from the distal regions of the shaft until $\Delta p3 = \Delta p1 - \Delta p2$. The shaft is therefore fully supporting the sleeve for rotation without the loss of fluid.

Figure 4:
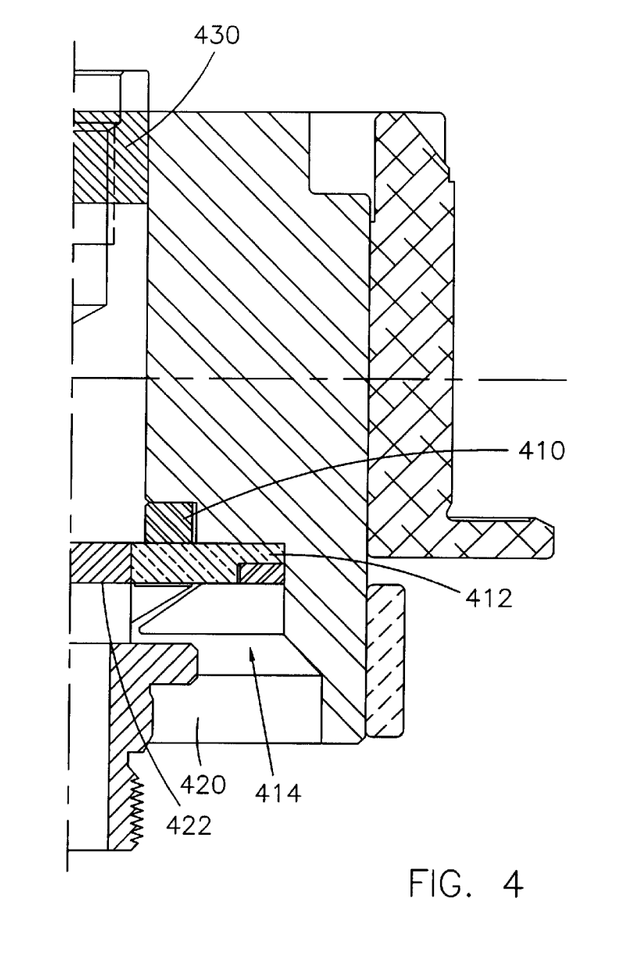
FIG. 4 is a vertical section of an alternate embodiment of the invention.
Figure 5:
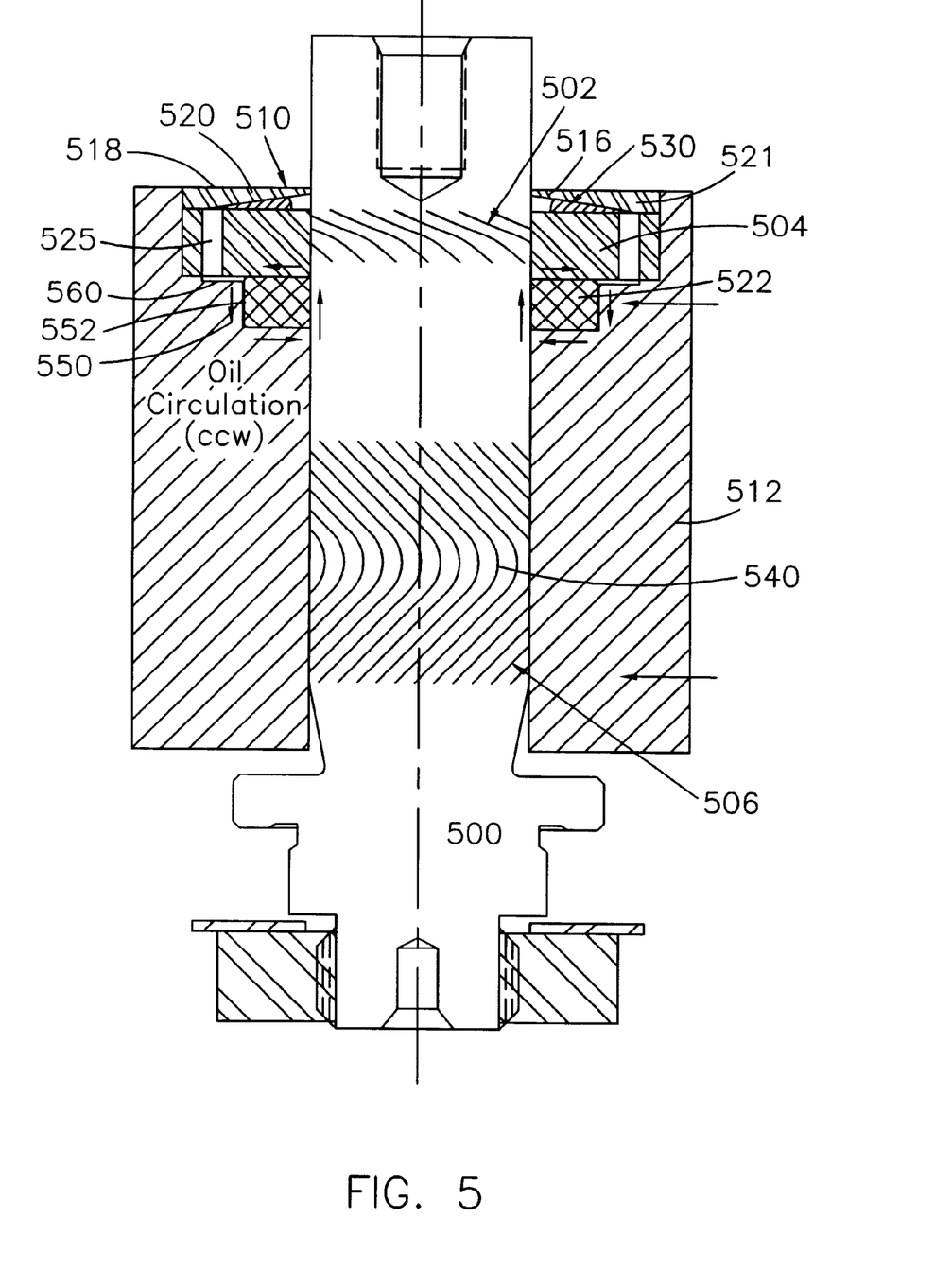
FIG. 5 is a vertical section of a further alternate.

FIG. 4 utilizes the same concepts and principals as FIG. 3B, but with the thrust plate and journals inverted relative to the motor base. That is, it is now the end of the shaft closest to the base which protrudes through a counterplate, with the thrust plate 410 being adjacent to counterplate 412 and a grooved pumping seal 422 adjacent the counterplate 412 and defined by grooves on either the shaft or surrounding counterplate. A grooved pumping seal 430 which produces a greater pressure as generally indicated by the greater axially extent of the grooves on the shaft or sleeve is again located at the distal end of the shaft from the thrust plate and counterplate to provide the counterbalancing pressure. FIG. 5 is an alternative embodiment of the present invention using opposed seals comprising at least one active seal near each end of the shaft to provide a balanced and powerful active support for the shaft.

More specifically, in this design, a grooved pumping seal 502 at the end of the shaft which protrudes through the counterplate 504 cooperates with what is effectively a second grooved seal 506 which is spaced axially toward the distal end of the shaft 500 and with a single centrifugal capillary seal 510 located adjacent one of the grooved pumping seals and specifically the one 502 formed adjacent the thrust plate on the shaft to maintain the necessary fluid distribution over the shaft to allow for free rotation of the sleeve 512. When the motor or sleeve 512 spins up, the two seals 502, 506 pump fluid along the shaft, with any excess fluid being contained in the centrifugal capillary seal 510 and specifically behind the meniscus 516 contained between the upper surface 518 of the thrust plate and the angled facing surface of the retainer 520. The fluid is normally circulating about the thrust plate over the three surfaces of the thrust plate 522 and either through the thrust plate or between the thrust plate and the shaft through relief holes or grooves provided therein. Any excess fluid passes through the relief passages 525 in the counter plate and up into the meniscus region 530 formed by the centrifugal capillary seal wherein the angled surface 520 of the retainer 521 is rotating relative to the facing surface of the counter plate 504. Once again, the centrifugal capillary seal 510 acts as a low stiffness high volume seal and reservoir for the overall system. The grooved pumping seals 502, 506 are high stiffness low volume reservoirs. As an added advantageous feature of this design, the lower asymmetric section of the journal grooved pattern 540 for the shaft journal bearing can serve as the bottom grooved pumping seal 506 while the top grooved pumping seal is provided by grooving the interior surface of the counterplate 504, or if desired, the exterior surface of the shaft.

It has been demonstrated experimentally that the radial clearance at the top grooved pumping seal (here the top grooved pumping seal being the grooved pumping seal radially adjacent the counterplate), is on the order of 0.010, 2.020 mm. Similar grooving geometry could be used lower grooved pumping seal 506. Air purging is aided by the oil circulation path generally indicated by the arrows 550 surrounding the thrust plate 522. That is, the oil flows towards the shaft on the bottom surface of the thrust plate and away from the shaft on the top surface of the thrust plate. This circulation direction is provided or caused by either asymmetry in the thrust plate grooving (that is with the grooving on the top thrust plate being more strongly in the counter clockwise direction, or by optional pumping grooves in the radial gap 552 between the thrust plate and the surrounding sleeve 512). Pressure gradients cause air in the fluid system to go into the oil planum between a surface of the sleeve and a surface of the counterplate and thence be led into the relief passage 525. Any air would thereafter move through the passage 525, and into the reservoir region of the centrifugal capillary seal from which it is expelled through the meniscus.

Other features and advantages of the present invention will occur to a person schooled in the art who studies the present invention disclosure. Therefore, the scope of the present invention is to be limited by only the following claims.

What is claimed:

1. In a spindle motor for a disc drive including a hub supporting one or more discs for rotation about a fixed central axis and shaft of a motor,
    said shaft having a hydrodynamic bearing defined in a gap between said fixed shaft and a rotating, surrounding sleeve, said gap having a bearing fluid therein, and an array of seals supported along said shaft comprising
    one or more low stiffness, high volume seals cooperating with one or more high stiffness, low volume seals spaced apart from each other along said shaft to seal said fluid within said shaft, the low stiffness, high volume seal comprising a centrifugal capillary seal including a cone supported on the shaft and a seal plate supported on the sleeve for relative rotation to define a reservoir holding the high fluid volume, said low volume seal comprising relatively rotating facing sections of the shaft and sleeve, one of the shaft and the sleeve having a grooved region to establish the low volume, high stiffness seal.

2. A spindle motor as claimed in claim 1 wherein said array of seals comprises a low volume, high pressure seal and adjacent a high volume, low pressure seal at one end of said shaft, and a high pressure, low volume seal at or near a second, distal end of said shaft.

3. A motor seal as claimed in claim 1 wherein said hub is supported from the sleeve which rotates around the shaft, said hydrodynamic bearing includes the bearing cone supported on an outer surface of said shaft having a generally conical outer surface cooperating with a generally complementary surface of said sleeve to define a portion of a gap said hydrodynamic bearing, a radial surface of said cone cooperating with a radial surface of the seal plate to establish radial, diverging walls of a reservoir of the centrifugal capillary seal.

4. A motor as claimed in claim 3 wherein said centrifugal capillary seal is adjacent a conical bearing, including a cone supported on the shaft and the sleeve having a surface facing a surface of the cone, said bearing cone includes openings defined between said bearing cone and said shaft communicating with a hole defined from a rear surface of said bearing cone to said generally radial wall of said bearing cone to allow said fluid to circulate around said bearing cone and to support the formation of a meniscus in a radial end of said reservoir of the centrifugal capillary seal.

5. A motor as claimed in claim 4 wherein said openings between said cone and said shaft and said hole through said cone communicate with a reservoir defined in an outer surface of said shaft to provide additional fluid to said hydrodynamic bearing.

6. A motor as claimed in claim 3 including a top seal plate affixed to an outer surface of said shaft and cooperating with said generally conical outer surface of said bearing cone to define one of said walls of said reservoir, a meniscus being formed from an opposite wall of said seal cone to a facing surface of said seal plate.

7. A motor as claimed in claim 3 including the sealing cone affixed to an outer surface of said shaft and having an acute angled surface defining one of said radial walls of said reservoir, said reservoir being defined between said acute angled wall of said sealing cone and an acute angled wall of said sealing cone, said acute angled walls tapering together toward an apex of said sealing cone.

8. A motor as claimed in claim 7 wherein said sealing cone further includes a generally radial surface facing the radial surface of said bearing cone and defining a gap therewith in communication with said gap of said hydrodynamic bearing.

9. A motor as claimed in claim 8 wherein rotation of said hub relative to said sealing cone creates capillary pressure on bearing fluid in said reservoir to force said fluid toward a common apex of said sealing cone and said bearing cone whereby said fluid is maintained within said reservoir.

10. A motor as claimed in claim 9 wherein one of said complementary surfaces of said bearing cone and said relatively rotating sleeve has grooves thereon to create pressure away from said apex of said bearing cone toward a narrow end of said bearing cone, air bubbles which appear in said fluid moving against said pressure to said apex of said bearing cone and through said reservoir to an open end of said reservoir.

11. A motor as claimed in claim 3 wherein said grooved seal comprises an outer surface of said shaft and a surrounding surface supported from and rotating with said hub, one of said shaft surface and hub having grooves.

12. In a spindle motor for a disc drive including a hub supporting one or more discs for rotation about a fixed central axis and shaft of a motor, said shaft having a hydrodynamic bearing defined in a gap between said fixed shaft and a rotating, surrounding element, said gap having a bearing fluid defined therein, and an array of seal means supported along said shaft but separated from each other to conform the fluid utilized in fluid dynamic bearing supporting the shaft comprising
first means for scaling utilizing a sealing cone supported from the shaft having an acutely angled surface facing a relatively rotating acutely angled surface of a seal plate across a reservoir to contain a high volume of fluid at low stiffness cooperating with at least a second means comprising relatively rotating cylindrical sections of shaft and sleeve for sealing, containing a low volume of fluid at high stiffness along said shaft to seal said fluid within said shaft.

13. A spindle motor as claimed in claim 12 wherein said array of seals comprises a low volume, high stiffness seal means adjacent a high volume, low pressure seal means at one end of said shaft, and a high pressure, low volume seal means at or near a second, distal end of said shaft.

* * * * *